(12) United States Patent
Vaisman et al.

(10) Patent No.: US 8,297,065 B2
(45) Date of Patent: Oct. 30, 2012

(54) THERMALLY ACTIVATED HIGH EFFICIENCY HEAT PUMP

(75) Inventors: Igor B. Vaisman, West Hartford, CT (US); Michael F. Taras, Fayetteville, NY (US); Joseph J. Sangiovanni, West Suffield, CT (US)

(73) Assignee: Carrier Corporation, Farmington, CT (US)

( * ) Notice: Subject to any disclaimer, the term of this patent is extended or adjusted under 35 U.S.C. 154(b) by 375 days.

(21) Appl. No.: 12/675,212

(22) PCT Filed: Aug. 28, 2007

(86) PCT No.: PCT/US2007/018958
§ 371 (c)(1),
(2), (4) Date: Feb. 26, 2010

(87) PCT Pub. No.: WO2009/029068
PCT Pub. Date: Mar. 5, 2009

(65) Prior Publication Data
US 2010/0218513 A1    Sep. 2, 2010

(51) Int. Cl.
*F25B 1/00* (2006.01)
(52) U.S. Cl. .............. 62/115; 62/470; 62/498; 62/503
(58) Field of Classification Search .......... 62/6, 498, 62/470, 513, 115, 335, 238.2, 503; 165/104.11, 165/139
See application file for complete search history.

(56) References Cited

U.S. PATENT DOCUMENTS

| | | | |
|---|---|---|---|
| 4,285,211 | A | 8/1981 | Clark |
| 5,136,854 | A | 8/1992 | Abdelmalek |
| 5,761,921 | A | 6/1998 | Hori et al. |
| 6,880,344 | B2 | 4/2005 | Radcliff et al. |
| 6,962,056 | B2 | 11/2005 | Brasz et al. |
| 7,100,380 | B2 | 9/2006 | Brasz et al. |
| 7,216,498 | B2 | 5/2007 | Manole et al. |

OTHER PUBLICATIONS

International Search Report and Written Opinion mailed Sep. 10, 2008 (10 pgs.).
International Preliminary Report on Patentability mailed Mar. 11, 2010 (6 pgs.).

*Primary Examiner* — Mohammad Ali
(74) *Attorney, Agent, or Firm* — Cantor Colburn LLP

(57) ABSTRACT

A vapor compression cycle system is combined with a Rankine cycle system, with the two systems having a common suction accumulator from which the compressor draws refrigerant vapor for the vapor compression cycle system and from which a pump draws liquid refrigerant for circulation within the Rankine cycle system. The vapor from the Rankine cycle system expander is passed to the compressor discharge to provide a mixture which is circulated within the vapor compression cycle system to obtain improved performance. The heat exchangers are sized so as to obtain a non-complete evaporation, with the resulting two-phase fluid passing to the suction accumulator to provide liquid refrigerant to the Rankine cycle system and vapor refrigerant to the vapor compression cycle system.

44 Claims, 11 Drawing Sheets

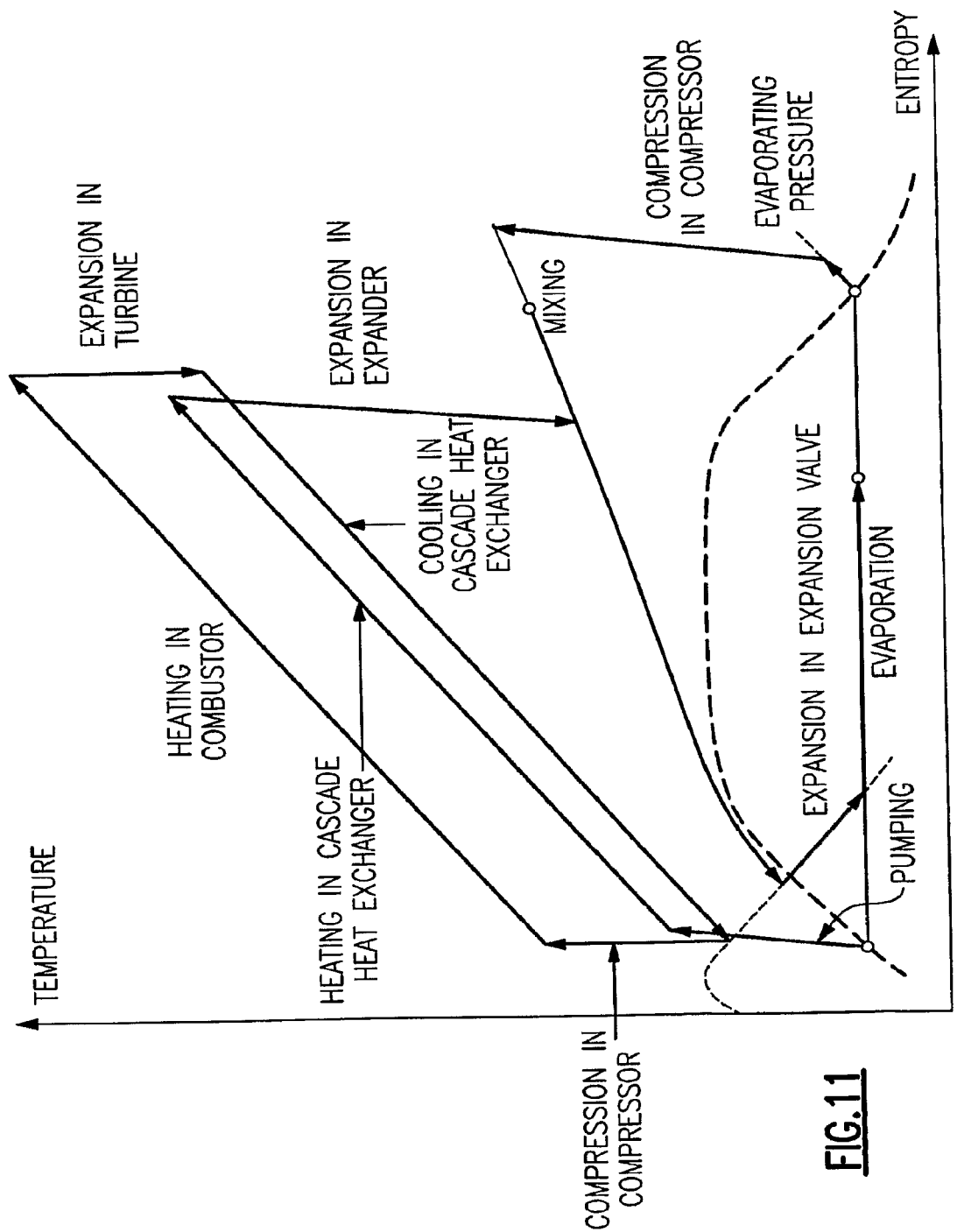

THERMALLY ACTIVATED HIGH EFFICIENCY HEAT PUMP

TECHNICAL FIELD

This invention relates generally to vapor compression systems and, more particularly, to a combined vapor compression and a Rankine cycle system.

BACKGROUND OF THE INVENTION

It is known to combine a vapor compression system with a Rankine cycle system. See, for example, U.S. Pat. No. 6,962,056, assigned to the assignee of the present invention. In the U.S. Pat. No. 5,761,921 power generated in the Rankine cycle is applied to drive the compressor of the vapor compression cycle, and the combined systems operate on three pressure levels, i.e. the boiler, condenser and evaporator pressure levels.

In the U.S. Pat. No. 5,761,921, the condenser (heating) capacity includes two main components, the boiler heat exchanger capacity and the evaporator capacity, thereby increasing the heating effect for a given thermal input. However, such heat pumps are very sensitive to ambient temperature in a heating mode of operation, since the heating capacity decreases as ambient temperature decreases. This occurs because the density of vapor refrigerant at the compressor suction and the compressor volumetric efficiency are reduced as the ambient temperature decreases. Also, system operation in cooling is somewhat inefficient, and the efficiency drops when the ambient temperature increases.

Further, the combined systems cannot use trans-critical refrigerants, since there is no condensed liquid available downstream of the gas cooler for pumping through the Rankine circuit.

DISCLOSURE OF THE INVENTION

Briefly, in accordance with one aspect of the invention, the combined vapor compression and Rankine cycle systems include a common suction accumulator, with liquid refrigerant being drawn therefrom for the Rankine cycle and refrigerant vapor being drawn therefrom for the vapor compression cycle, thereby resulting in increased efficiencies, due to removal of the non-efficient heat exchange zone from the evaporator, and improved performance characteristics at off-design conditions.

In accordance with another aspect of the invention, the vapor from the outlet of the expander is combined with the vapor from the outlet of the compressor, with the combined flow being circulated through the vapor compression cycle. The evaporator capacity is therefore enhanced, and the condenser (heating) capacity is increased, thereby benefiting the operation in the heating mode. Also, the mass flow rate pumped by the compressor is less than the mass flow rate circulated through the evaporator, thereby reducing the ratio of the compressor power to the evaporator capacity. Further, when the ambient temperature decreases, in heating, liquid refrigerant density at the pump inlet, the mass flow rate through the Rankine loop, and the available power for the compressor, increase, thereby improving heating efficiency.

In accordance with another aspect of the invention, the liquid refrigerant in the suction accumulator has elevated concentrations of oil. This provides boiling point elevation, which is equivalent to a few degrees of subcooling and mitigates a risk associated with the cavitation phenomenon in the liquid refrigerant pump.

In accordance with another aspect of the invention, the outdoor and indoor heat exchangers are sized so as to provide non-complete evaporation, thereby eliminating the otherwise non-efficient vapor-to-air heat exchange zone, carrying a portion of liquid refrigerant enriched with compressor lubricant from the evaporator and moves it into the heat exchanger where the heat regeneration is accomplished more efficiently. Further, the pumped liquid has a higher specific heat at the boiling pressure then the condensed liquid at the condensing pressure, which provides heat regeneration of the non-evaporated portion and higher evaporator capacity. As a result, the cooling capacity and COP, and the heating capacity and COP, are higher. The non-evaporated liquid is the working fluid for the Rankine circuit, and the cooler liquid has a greater thermodynamic potential to cool the fluid carrying the thermal source for the boiler, thereby resulting in a higher thermodynamic efficiency of the power generation.

In accordance with another aspect of the invention, the inventive system may utilize trans-critical refrigerants and BZT-fluids which may be optimized to provide a better pump-to-expander power ratio.

In the drawings as hereinafter described, a preferred embodiment is depicted; however, various other modifications and alternate constructions can be made thereto without departing from the spirit and scope of the invention.

BRIEF DESCRIPTION OF THE DRAWINGS

FIG. 11 is a T-S diagram of the cascade system in accordance with the present invention.

DETAILED DESCRIPTION OF THE INVENTION

Figure 1:
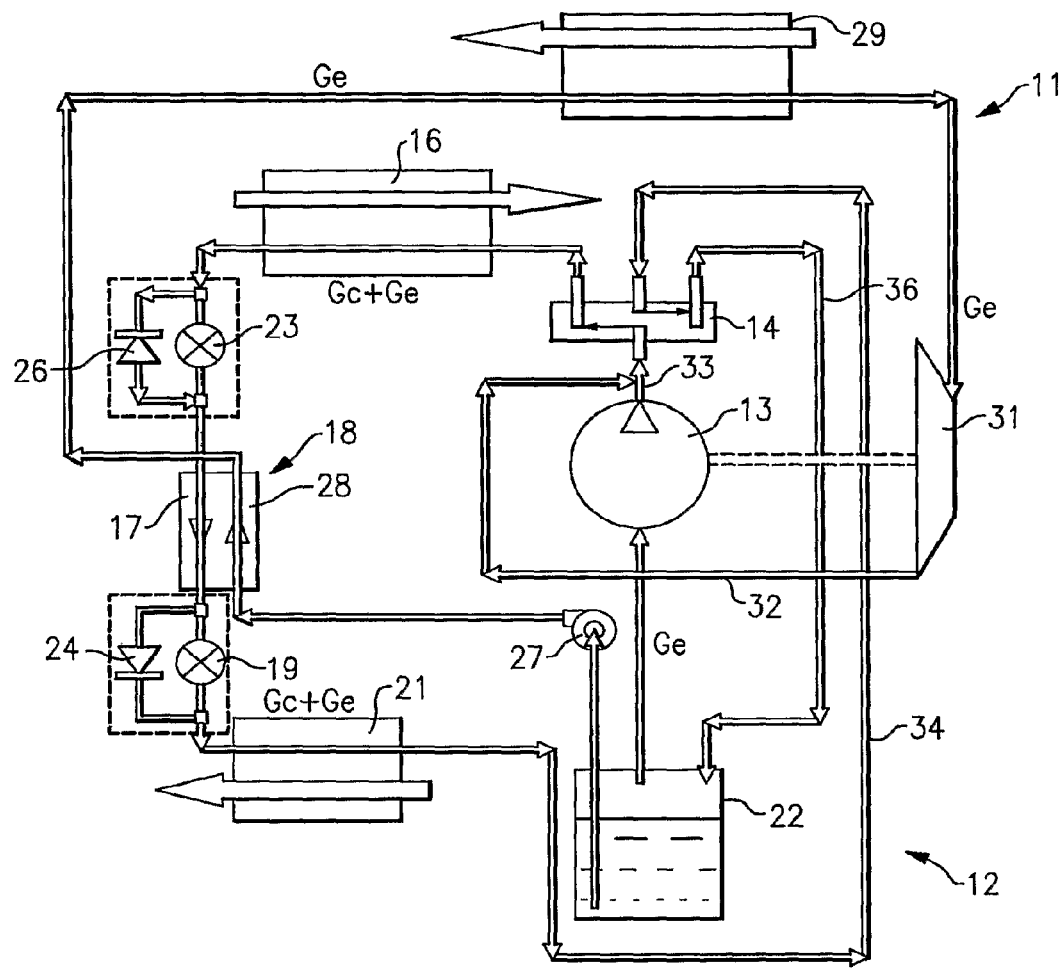
FIG. 1 is a schematic illustration of the present invention.

Shown in FIG. 1 is a system which, in accordance with the present invention, utilizes a combination of a Rankine and a vapor compression cycles. The cycle combination may be called a vapor compression and expansion cycle. The combined system may be called a vapor compression and expansion system.

The vapor compression circuit 12 includes, in serial flow communication relationship, a compressor 13, a reversing valve 14, an outdoor heat exchanger 16, one side (or a first pass) 17 of an economizer heat exchanger 18, an expansion device 19, an indoor heat exchanger 21, and a suction accumulator 22. Also, included is an expansion device 23 for use in the heating mode of operation. Bypass valves 24 and 26 may be provided to bypass the respective expansion devices 19 and 23 when switching between cooling and heating modes of operation. The reversing valve 14 is, of course, selectively controlled to operate in either the cooling or heating mode of operation.

The Rankine cycle circuit 11 includes, in serial flow communication relationship, the suction accumulator 22, a liquid refrigerant pump 27, another side (or a second pass) 28 of the economizer heat exchanger 18, a boiler 29 and an expander 31. The expander 31 can be mechanically connected to the compressor 13 as shown for purposes to assist in driving the compressor 13. Alternatively, the expander 31 may be connected to drive a generator, with the resulting generated electricity potentially used to assist in driving one or more components of the refrigerant system. For instance, the generated electricity may be applied to assist in driving the compressor 13 and/or the pump 27. Excessive electricity may be fed to the electric grid if desired. When no cooling or heating is needed, the Rankine circuit may be used for power generation only. Also, the expander 31, the compressor 13, and the generator may be mechanically connected. All mechanically connected components may be enclosed in one hermetic or semi-hermetic casing.

The combined system operates at three pressure levels: a boiling pressure established in the boiler 29, with the highest pressure defined by an available thermal source; a condensing pressure defined by the ambient environment in a cooling mode and/or set temperature of the heated medium in a heating mode; and an evaporator pressure, the lowest pressure established in the evaporator due to interaction with the medium to be cooled in the cooling mode and/or ambient environment in the heating mode.

The Rankine circuit operates between the boiling and condensing pressure as follows. The pump 27 circulates liquid refrigerant from the suction accumulator 22 through the second pass 28 of the economizer heat exchanger 18, where heat is transferred from the flow in the first pass 17 of the heat exchanger 18. The high pressure liquid then flows to the boiler 29 where it is vaporized. The generated high pressure vapor is expanded in the expander 31 with the expanded vapor then passing along a line 32 to a line 33, where it is mixed with the compressed vapor from the compressor 13. The combined mixture than passes through the reserving valve 14, from where it is passed to either the outdoor heat exchanger 16 when in the cooling mode of operation or to the indoor heat exchanger 21 when in the heating mode of operation.

The vapor compression system 12 operates between the condenser and evaporator pressure in either the cooling or heating mode. In the cooling mode, the indoor heat exchanger 21 operates as an evaporator and the outdoor heat exchanger 16 operates as a condenser, whereas in the heating mode, the outdoor heat exchanger 16 operates as an evaporator and the indoor heat exchanger 21 operates as a condenser. The reversing valve 14 of course, is the device that is controlled to switch between the cooling and heating modes of operation.

In the cooling mode, the reversing valve 14 directs the combined vapor stream into the outdoor heat exchanger 16 operating as a condenser. The subcooled refrigerant from the outdoor heat exchanger 16 passes through the bypass valve 26 and to the economizer heat exchanger 18 where it is further subcooled by the cooler liquid flowing within the second pass 28 of the economizer heat exchanger 18. The subcooled liquid then flows to the expansion valve 19 where it is expanded from condenser pressure to the evaporator pressure. The two-phase refrigerant passes through the indoor heat exchanger 21 which operates as an evaporator to provide air conditioning to a climate controlled space. The expanded vapor then passes along the line 34 to the reversing valve 14 and then along the line 36 to the suction accumulator 22.

It should be mentioned that the refrigerant system is sized for non-complete evaporation in the indoor heat exchanger 21. That is, some of the liquid refrigerant passing into the indoor heat exchanger 21 will not be vaporized and will remain in a liquid state. Therefore, when the two-phase fluid passes along the line 36 to the suction accumulator 22, the liquid portion will serve to replenish the liquid inventory at the bottom of the suction accumulator 22, and the vapor will be available in the upper portion of the suction accumulator 22 to be drawn out by the compressor 13.

In the heating mode, the Rankine cycle circuit 11 operates in substantially the same manner as described hereinabove, with respect to the cooling mode of operation. The vapor compression cycle 12 places the reversing valve 14 in such a position as to direct the combined vapor flow along the line 34 to the indoor heat exchanger 21, which operates to condense the vapor to a subcooled liquid, which then flows through the bypass valve 24 to the first pass 17 of the economizer heat exchanger 18, where it is further subcooled. The liquid refrigerant then passes through the expansion device 23, where is it expanded from the condensing pressure to the evaporator pressure and passed into the outdoor heat exchanger 16, which operates as an evaporator. The fluid then passes into the reversing valve 14, and along the line 36, to the suction accumulator 22.

Again, the system is sized for non-complete evaporation such that some liquid remains in the line passing from the outdoor heat exchanger 16. The two-phase fluid then enters the suction accumulator 22, with the liquid going to the bottom to replenish the liquid refrigerant inventory passing into the Rankine cycle circuit, and the vapor being available at the suction port of the compressor 13.

The vapor compression and expansion systems may use subcritical refrigerants, transcritical refrigerants, BZT fluids, or mixtures of fluids. At least one fluid in the mixture may be a lubricant.

The outlet flow from the evaporator (the indoor unit in the cooling mode or the outdoor unit in the heating mode) contains a high concentration of oil.

Figure 2:
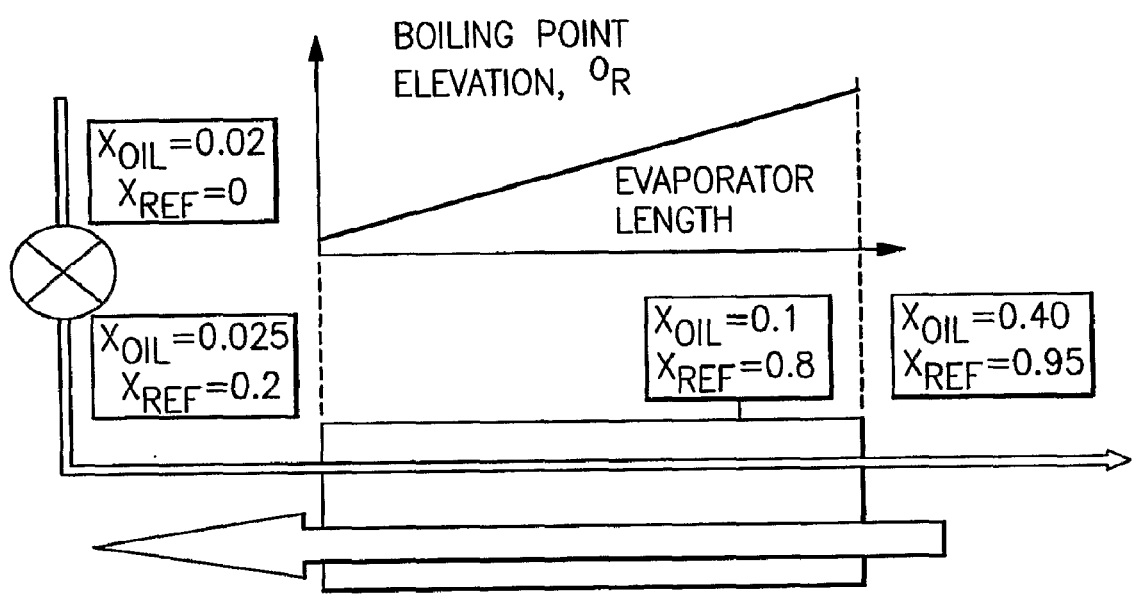
FIG. 2 is a boiling point elevation demonstration.

As shown on FIG. 2, $X_{oil}$ is the mass concentration of oil and $X_{ref}$ is the refrigerant vapor quality at the inlet to the expansion device, at the inlet to the evaporator, and at the outlet of the evaporator. When liquid refrigerant boils out, a mass concentration of oil in the remaining liquid portion of the refrigerant is increased, together with a boiling point of the oil-refrigerant mixture. The difference between the boiling point of an oil-refrigerant mixture and the evaporation temperature of a pure refrigerant is referred to as a boiling point elevation. The higher the oil concentration is, the higher the boiling point elevation is.

Eventually, the boiling point elevation would terminate the evaporation process. As per FIG. 2, if there is 2% of oil carryover in the compressor unit, and refrigerant quality at the evaporator inlet is 0.2, then at vapor quality of 0.95 at the evaporator outlet, there will be 40% of oil in the oil-refrigerant mixture at the evaporator outlet.

Liquid refrigerant containing high concentration of oil, high vapor quality and/or superheated vapor refrigerant create an extremely inefficient heat exchange zone at the evaporator outlet. In the present case, this zone is moved from the evaporator to the economizer heat exchanger 18, where heat regeneration is accomplished more efficiently.

The liquid refrigerant in the suction accumulator 22 tends to have elevated concentration of oil. This provides for boiling point elevation as per FIG. 2, which is equivalent to a few degrees of subcooling, and mitigates a risk associated with the cavitation phenomenon in the liquid refrigerant pump 27.

Removal of the non-efficient heat exchange zone from the evaporator, and reduction of the vapor quality at the evaporator inlet and outlet, improve performance characteristics of the evaporator. As a result, the same evaporator may generate higher evaporator capacity. Enhancement of evaporator capacity is always beneficial for both cooling and heating modes of operation, and cooling and heating COPs are improved. Alternatively, the same evaporator duty may be provided in a smaller evaporator, which is a cost benefit.

Other advantages offered by the above described combination of elements should be recognized. The evaporator handles the refrigerant stream Gc pumped by the compressor and the refrigerant stream Ge circulating through the Rankine cycle circuit. The refrigerant stream Gc evaporates providing the same duty as in the base case. The liquid refrigerant stream Ge regenerates its enthalpy in the economizer heat exchanger decreasing refrigerant enthalpy at the inlet to the evaporator and increasing the cooling effect in the evaporator. On the other hand, the compressor pumps the same amount of refrigerant as the base system and consumes the same power. Enhancement of evaporator capacity is always beneficial for both cooling and heating modes of operation. Therefore, the present cycle has enhanced thermodynamic efficiency for heating and cooling modes of operation.

In addition to the advantages described hereinabove, it should be mentioned that performance improvement is substantial at off-design conditions.

Normally, when hot ambient temperature is elevated, cooling performance characteristics degrade, since the compressor pressure ratio increases and expander pressure ratio decreases. In the present system, as the ambient temperature elevation increases, it drives the temperature difference for the economizer heat exchanger, thereby increasing its capacity and resistance to capacity degradation.

When cold ambient temperatures is reduced, heating performance characteristics degrade, since the compressor pressure ratio increases and the refrigerant vapor density at the compressor inlet decreases. When ambient temperature is reduced, liquid refrigerant density increases, pumped mass flow rate through the Rankine circuit increases, and the compressor spins faster, thereby resisting performance degradation. On the other hand, as ambient temperature drop increases, it drives the temperature difference for the economizer heat exchanger, thereby increasing its capacity and resistance to capacity degradation.

Traditional Rankine cycle systems, as well as systems combining the Rankine and vapor compression cycles, cannot use transcritical refrigerants, since the transcritical systems do not have condensers and liquid refrigerant at the condenser outlet. Rather, they have gas coolers and compressed cooled gas at the gas cooler outlet. The Rankine cycle circuits need liquid at the pump inlet.

The use of the transcritical refrigerants and BZT fluids in optimized vapor compression and expansion systems may provide a better pump-to-expander power ratio and, as a result, enhanced thermodynamic efficiency.

Figure 3:
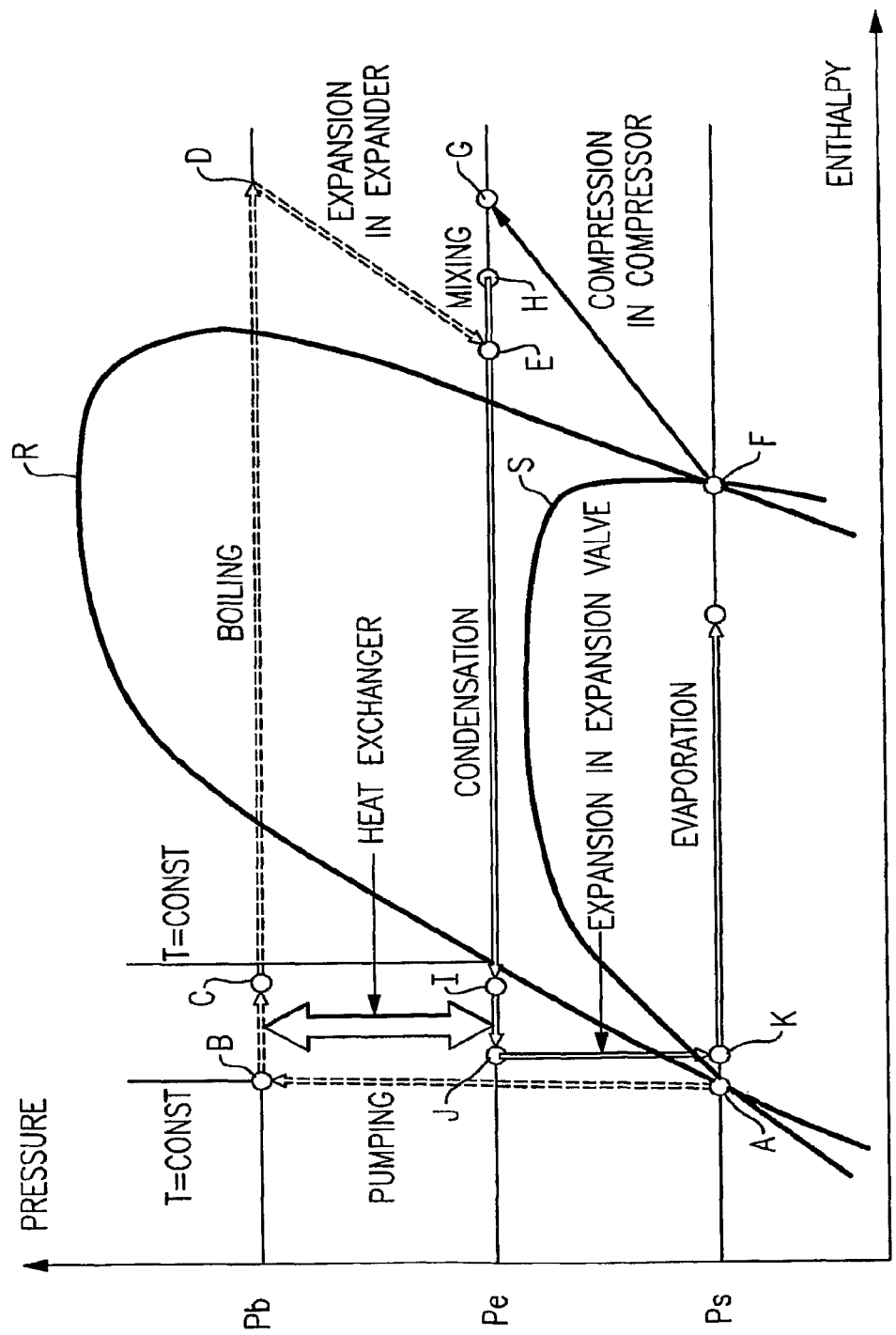
FIG. 3 is a graphic illustration of the P-h diagram of the present invention.

Referring now to FIG. 3, the pressure-enthalpy (P-h) diagram is shown for the vapor compression and expansion heat pump system of the present invention. The processes in the diagram are the same for subcritical and transcritical refrigerants. The differences are reflected by the saturation lines R and S, which are the saturated lines for a subcritical and a transcritical refrigerant, respectively.

Here, the three pressures, the boiler pressure (or high pressure for transcritical refrigerants), the condenser pressure (or discharge pressure for transcritical refrigerants) and evaporator pressure are represented by Pb, Pe and Ps, respectively. In the Rankine cycle, as represented by the dashed lines, the pump 27 causes the refrigerant pressure to be increased from the evaporator pressure $P_s$ to the boiling pressure $P_b$, passing from the point A to the point B. When passing through the economizer heat exchanger 18, the refrigerant enthalpy is increased, as indicated by the line between the points B and C. In the boiler 29, the enthalpy is substantially increased, as represented by the line between the points C and D. Finally, the expander 31 causes a reduction in both the refrigerant pressure and the enthalpy, as represented by the lines between the points D and E.

In the vapor compression cycle, as represented by the solid lines, the vapor entering the compressor 13 from the suction accumulator 22 is at the evaporator pressure $P_s$, as indicted at the point F, and the compressor raises both the refrigerant pressure and the enthalpy to the values shown at the point G. After the mixing of the two streams in the line 33, the refrigerant pressure remains at the same level, but the refrigerant enthalpy has decreased to the values corresponding to the point H. As the refrigerant vapor is condensed in a condenser 16, its enthalpy is reduced to the value corresponding to the point I. The liquid refrigerant is then subcooled in the economizer heat exchanger 18 such that its enthalpy is reduced to the value corresponding to the point J. Most of the liquid is then expanded in the expansion device 19 with the pressure being reduced to the value shown at the point K. Finally, as most of the refrigerant is evaporated in the evaporator 21, its enthalpy is increased along the line K-F to complete the cycle.

A combination of the two cycles is therefore represented by the curve R and S as shown.

Figure 4:
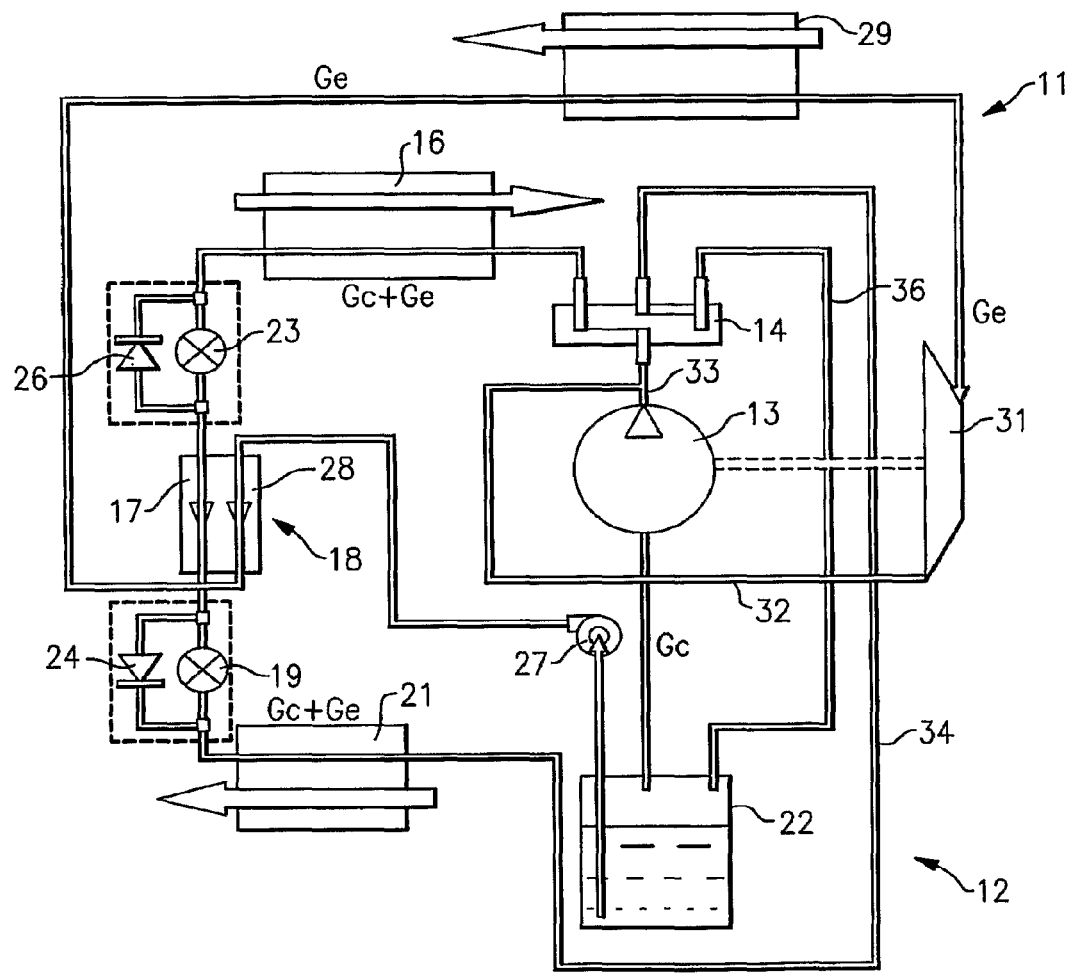
FIG. 4 is other schematic illustration of the present invention.

The economizer heat exchanger in FIG. 4 provides a counterflow arrangement in the cooling mode and a parallel flow arrangement in the heating mode. In some cases, it might be beneficial to have reversed arrangements. FIG. 4 shows a system with an economizer heat exchanger providing parallel flow heat exchange in the heating mode and counterflow heat exchange in the cooling mode.

Figure 5:
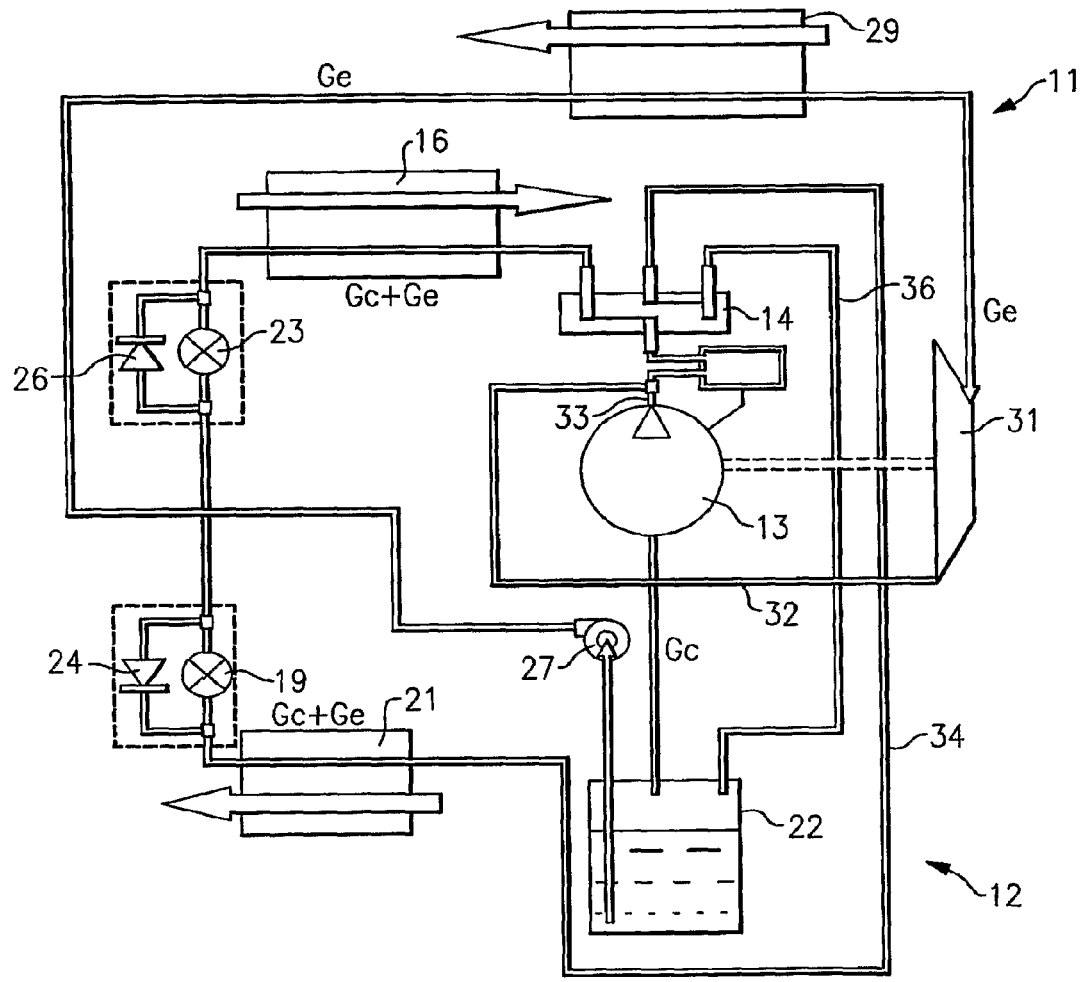
FIG. 5 is a schematic illustration of the present invention without an economizer heat exchanger.

FIG. 5 shows a thermally activated pump without the economizer heat exchanger. Since refrigerant temperature at the boiler inlet is colder, the boiler outlet temperature of the fluid supplying thermal energy for the Rankine circuit is colder as well. As a result, such a system retrieves more thermal energy from the fluid and allows the compressor shaft to spin faster. The faster spinning compressor provides enhanced performance characteristics of the entire thermally activated heat pump system.

Figure 6:
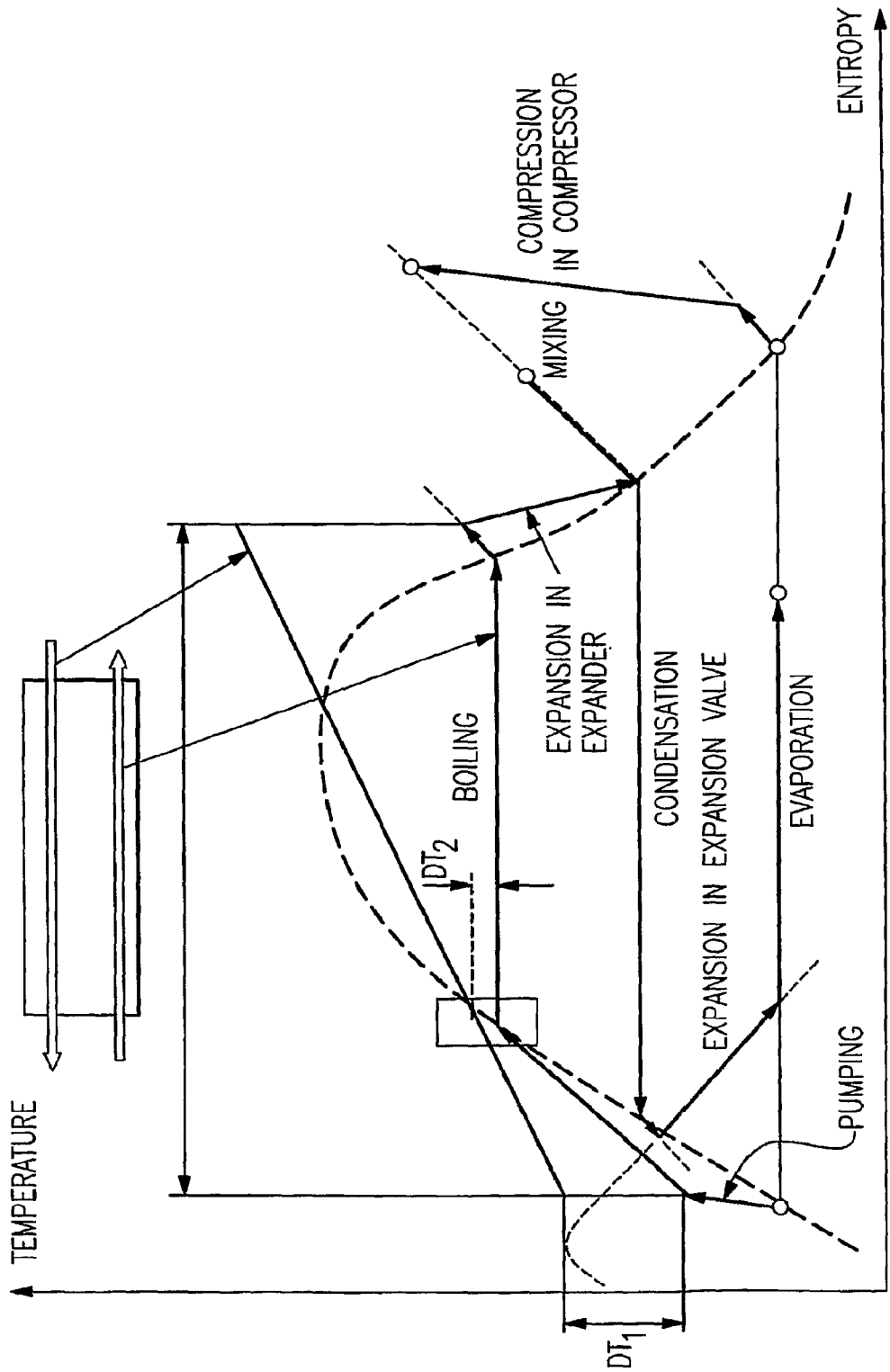
FIG. 6 is a T-S diagram of the present invention without an economizer heat exchanger.
Figure 7:
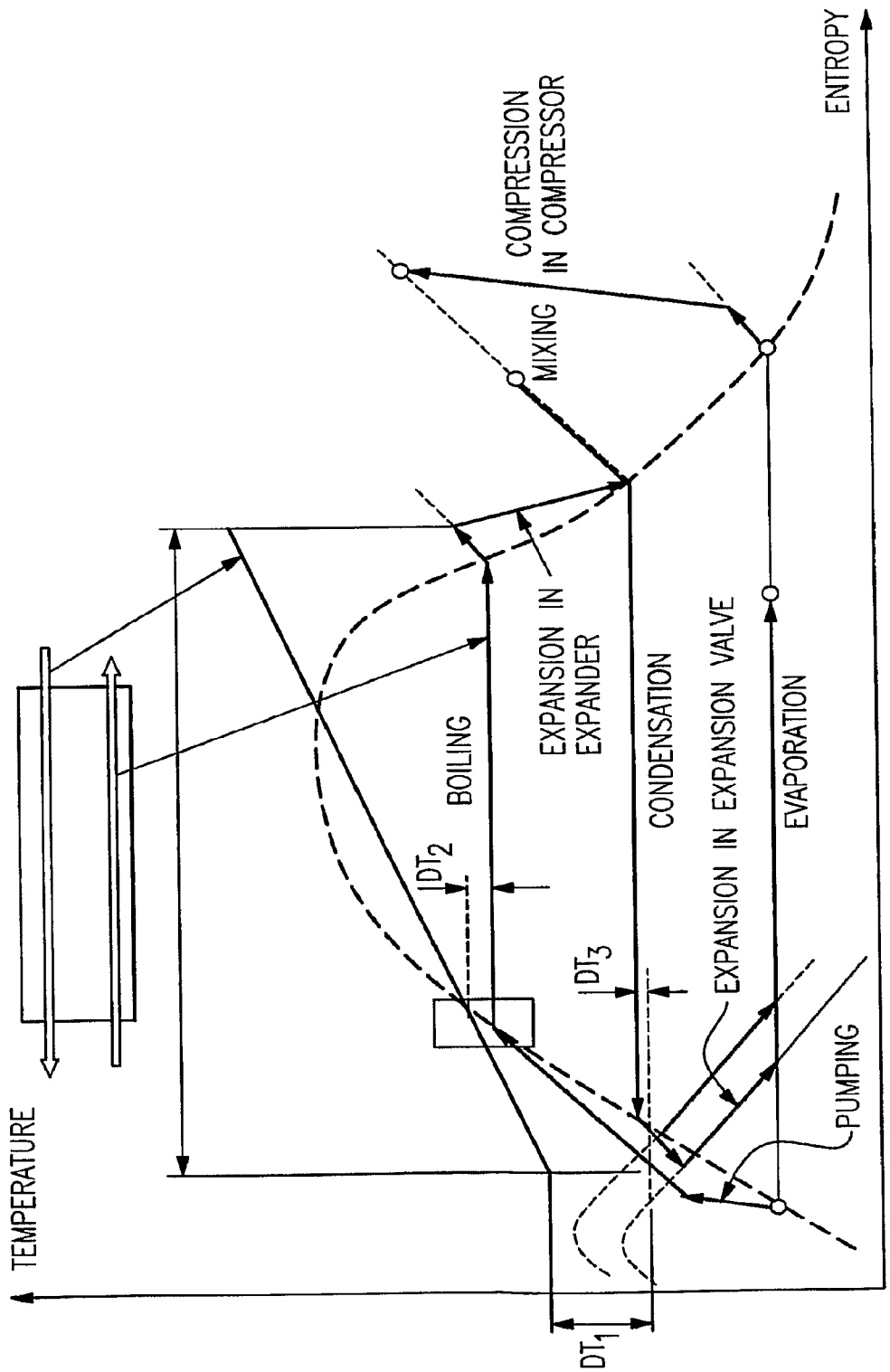
FIG. 7 is a T-S diagram of the present invention with an economizer heat exchanger.

A factor having strong impact on thermal characteristics of the boiler is the temperature difference $DT_1$ in the middle of the boiler (see the T-S diagram in FIG. 6). This temperature difference and the temperature difference $DT_2$ at the cold end of the boiler are interconnected. If $DT_2$ appears too high, it might be appropriate to use the economizer heat exchanger as shown in FIG. 1. The size of the economizer heat exchanger should be defined through a trade-off analysis, taking into consideration the temperature differences $DT_1$, $DT_2$, and $DT_3$ (i.e. the temperature differences at the hot end of the economizer heat exchanger) on FIG. 7 and their impact on cost of the boiler, the economizer heat exchanger, and performance characteristics of the entire system.

Figure 8:
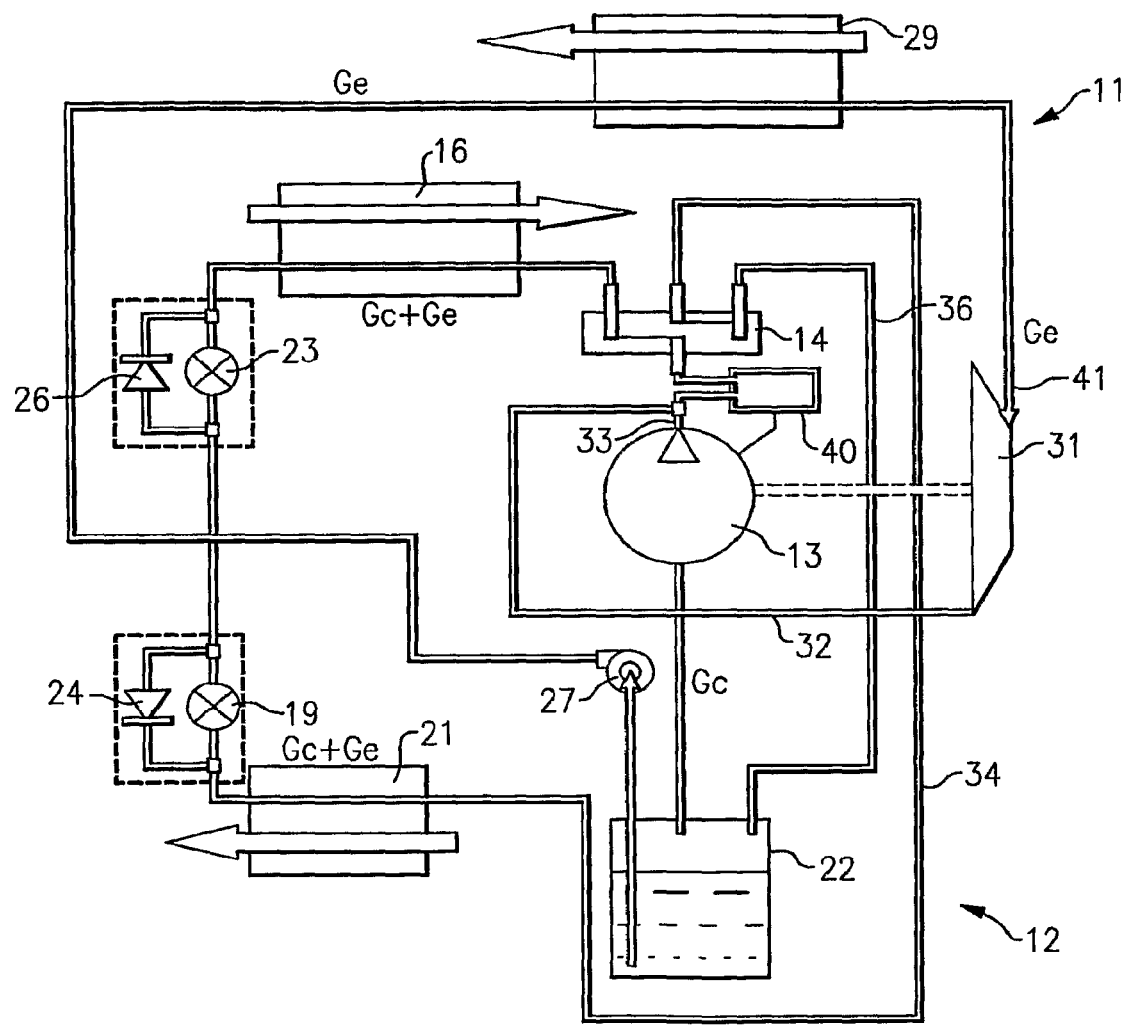
FIG. 8 is a schematic illustration of the present invention with an oil separator.

One way of oil management in the thermally activated heat pump system is shown in FIG. 8. The oil separator 40 is located at the inlet to the reversing valve 14 after the point where the Rankine cycle circuit stream and vapor compression circuit stream come together. The oil separated in the oil separator is returned into the compressor 13. As an option, a portion of the separated oil may be pumped into the expander 31 or to an expander inlet 41.

Figure 9:
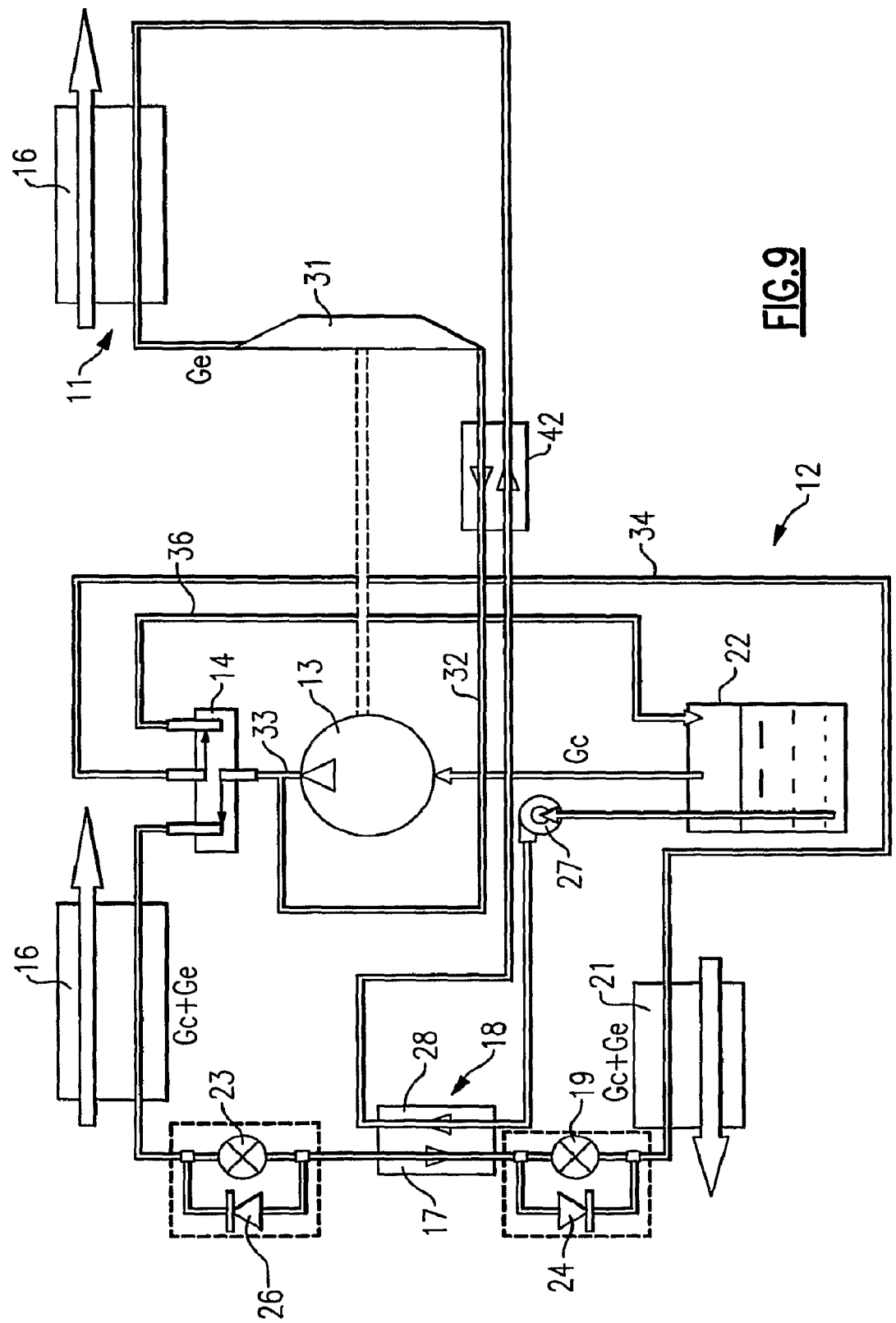
FIG. 9 is a schematic illustration of an alternative embodiment thereof.

A system as shown in FIG. 9 contains a regenerative heat exchanger 42 providing thermal contact between refrigerant leaving the expander 31 and refrigerant entering the boiler 29. This is useful for refrigerants that are still significantly superheated at the expander outlet.

The vapor compression and expansion system described above can be either a bottoming or a topping part of a cascade system, which provides heating or cooling. Also, it may or may not generate electrical power.

Figure 10:
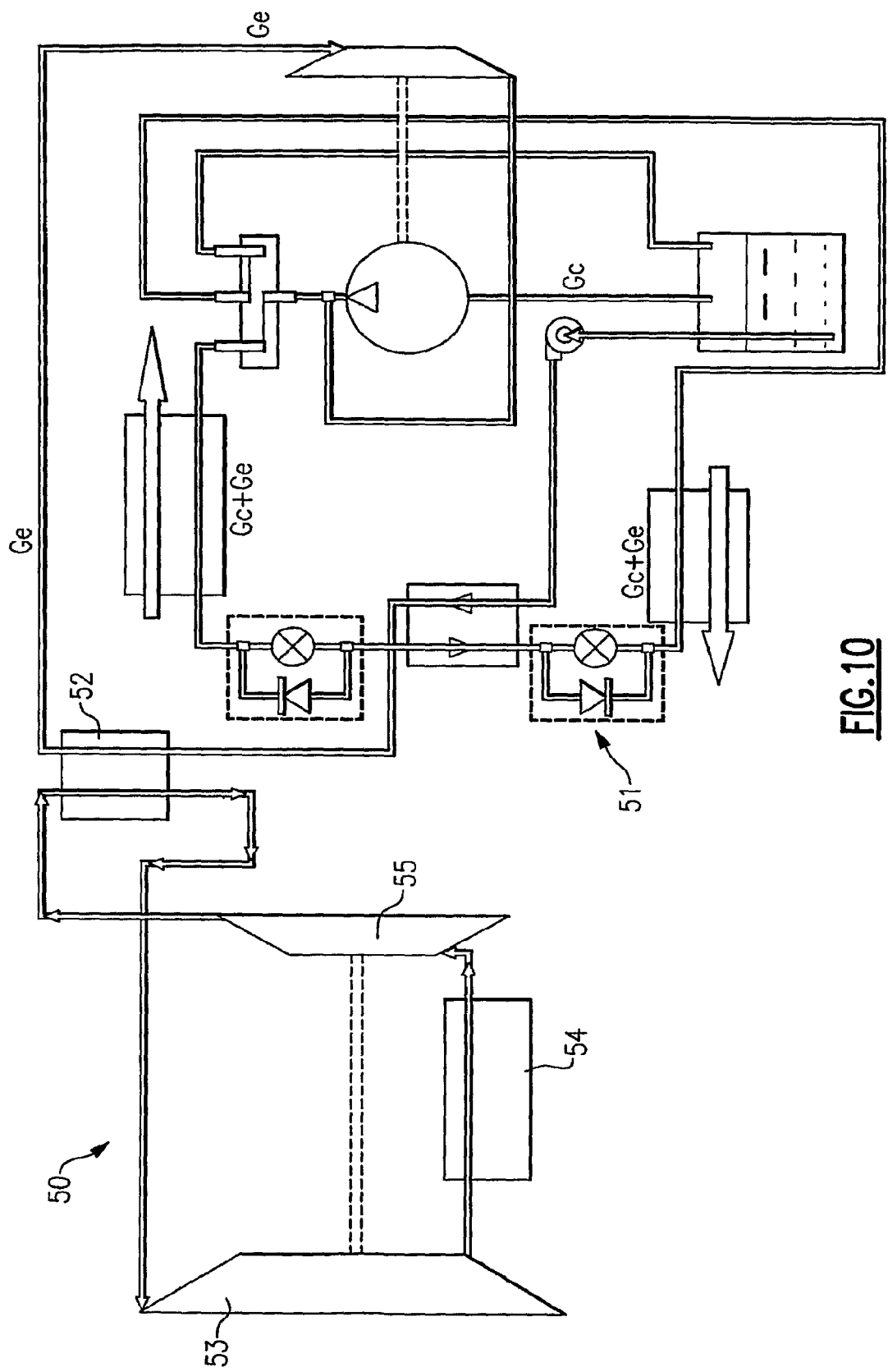
FIG. 10 is a schematic illustration of a cascade system in accordance with the present invention.

FIG. 10 shows a cascade system with a Brayton cycle system 50 used as a topping system and vapor compression and expansion system 51 used as a bottoming system. The cascade heat exchanger 52 provides a thermal contact between these systems and enables heating in the vapor compression and expansion system 51 due to cooling in Brayton cycle system.

The Brayton cycle system consists of a closed loop including at least a compressor 53, a combustor 54, a turbine 55, and the cascade heat exchanger 52. Such Brayton system arrangement is the simplest one. However, it should be understood that any other Brayton system modifications and enhancements may be applicable.

The turbine 55 can be mechanically connected to the compressor 53 for purposes of assisting in driving the compressor 53. Alternatively, the turbine 55 may be connected to drive a generator, with the resulting generated electricity. The generated electricity may be applied to assist in driving the compressor 53. Excessive electricity may be fed into the electric grid. Also, the Brayton cycle may be used for power generation only. As an option, the turbine 55, the compressor 53, and the generator can be mechanically connected.

The bottoming system functions as a co-generator which produces heating and cooling. Also, it may or may not generate electrical power.

FIG. 11 relates to a cascade system, where a bottoming cycle is a vapor compression and expansion system operating on a transcritical refrigerant. The cascade heat exchanger 52 provides a thermal contact between the fluid being cooled in the topping cycle and the fluid being heated in the bottoming cycle. The isobaric processes of both fluids have glides, which thermodynamically fit each other. This makes the use of the vapor compression systems for transcritical refrigerants as bottoming systems of cascade configurations, exceptional.

All systems as described above are for providing both heating and cooling. However, it should be understood that similar arrangements may be applied to thermally activated devices providing only heating or only cooling. In such cases, the reversing valve is not required.

While the present invention has been particularly shown and described with reference to the preferred mode as illustrated in the drawings, it will be understood by one skilled in the art that various changes in detail may be implied therein without departing from the spirit and scope of the invention as defined by the claims.

The invention claimed is:

1. A thermally activated heat pump comprising in combination:
    a vapor compression cycle system, the vapor compression cycle system includes, in a serial refrigerant flow communication, a compressor, a first heat exchanger, an expansion device, a second heat exchanger and a suction accumulator; and
    a Rankine cycle system, the Rankine cycle system includes, in a serial flow communication, the suction accumulator, a liquid refrigerant pump, a boiler and an expander;
    said compressor having a suction inlet and a discharge outlet, and said expander having an inlet and an outlet, and further wherein said expander outlet is fluidly connected to said compressor outlet to provide a combined flow for circulation through said first heat exchanger, said expansion device, said second heat exchanger and said suction accumulator of said vapor compression system.

2. The thermally activated heat pump as set forth in claim 1 wherein said refrigerant operates in a subcritical cycle, at least for a portion of the time.

3. The thermally activated heat pump as set forth in claim 1 wherein said refrigerant operates in a transcritical cycle, at least for a portion of the time.

4. The thermally activated heat pump as set forth in claim 1 wherein said refrigerant is a BZT fluid.

5. The thermally activated heat pump as set forth in claim 1 wherein said refrigerant is a mixture of fluids.

6. The thermally activated heat pump as set forth in claim 5 wherein at least one fluid of said mixture of fluids is a lubricant.

7. The thermally activated heat pump as set forth in claim 1 wherein an economizer heat exchanger provides a thermal contact between liquid refrigerant outgoing from said pump of said Rankine cycle system and liquid refrigerant entering said expansion device of said vapor compression cycle system.

8. The thermally activated heat pump as set forth in claim 1 wherein said first heat exchanger is used for heat rejection as an outdoor unit and said second heat exchanger is used as an evaporator providing cooling duty as an indoor unit.

9. The thermally activated heat pump as set forth in claim 1 wherein, said first heat exchanger is used for evaporation as an outdoor unit and said second heat exchanger is used to provide heating duty as an indoor unit.

10. The thermally activated heat pump as set forth in claim 1 wherein a reversing valve is installed downstream of a point where refrigerant flow from said expander and refrigerant flow from said compressor are combined, said first heat exchanger is used as an outdoor unit, said second heat exchanger is used as an indoor unit, and said reversing valve is controlled to selectively provide appropriate refrigerant communication with said outdoor unit and said indoor unit to execute cooling and heating duties.

11. The thermally activated heat pump as set forth in claim 1 wherein, said refrigerant contains a lubricating oil, an oil separator is installed downstream of a point where refrigerant flow from said expander and refrigerant flow from said compressor are combined.

12. The thermally activated heat pump as set forth in claim 11 wherein the lubricating oil separated in said oil separator is returned to said compressor.

13. The thermally activated heat pump as set forth in claim 11 wherein at least a portion of the separated lubricating oil is returned to said expander.

14. The thermally activated heat pump as set forth in claim 1 wherein a regenerating heat exchanger provides a thermal contact between refrigerant outgoing from said expander and refrigerant entering said boiler.

15. The thermally activated heat pump as set forth in claim 1 wherein said compressor and said expander are positioned on the same shaft.

16. The thermally activated heat pump as set forth in claim 1 wherein said expander and a generator are positioned on the same shaft.

17. The thermally activated heat pump as set forth in claim 1 wherein said thermally activated heat pump comprises a topping system of a cascade system.

18. The thermally activated heat pump as set forth in claim 1 wherein said thermally activated heat pump comprises a bottoming system of a cascade system.

19. The thermally activated heat pump as set forth in claim 17 wherein:
said topping system of said cascade system comprises a Brayton cycle system;
said Brayton cycle system comprises at least a compressor, a combustor, a turbine, and a cascade heat exchanger; and
said cascade heat exchanger provides a thermal contact between said bottoming system and said topping system.

20. The thermally activated heat pump as set forth in claim 19 wherein said compressor of said topping system and said turbine of said topping system are positioned on the same shaft.

21. The thermally activated heat pump as set forth in claim 19 wherein said expander and a generator are positioned on the same shaft.

22. A method of combining a vapor compression cycle system with a Rankine cycle system to obtain increased thermodynamic efficiency in operation, comprising the steps of:
providing a vapor compression cycle system to include, in a serial flow communication, a compressor, a reversing valve, an outdoor heat exchanger, a first pass of an economizer heat exchanger, an expansion valve, an indoor heat exchanger and a suction accumulator;
providing a Rankine cycle system, the Rankine cycle system includes, in a serial flow communication, the suction accumulator, a liquid refrigerant pump, a second pass of the economizer heat exchanger, a boiler and an expander.

23. The method as set forth in claim 22 wherein the compressor includes a suction inlet and a discharge outlet, and said expander includes an inlet and an outlet, and further including the steps of fluidly connecting said expander outlet to said compressor outlet and providing a combined flow to be circulated through said vapor compression cycle system.

24. The method as set forth in claim 23 and including the steps of, when operating in a cooling mode, combining the flow of vapor from said compressor and from said expander and passing it through the reversing valve and then to the outdoor heat exchanger.

25. The method as set forth in claim 23 and including the steps of, when operating in a heating mode, combining the flow of vapor from said compressor and from said expander and passing it through the reversing valve and then to the indoor heat exchanger.

26. The method as set forth in claim 23 and including the steps of, when operating in a cooling mode, selectively controlling said reversing valve to pass the flow of refrigerant from the indoor heat exchanger through the reversing valve and then to the suction accumulator.

27. The method as set forth in claim 25 wherein said indoor heat exchanger is sized for a non-complete evaporation, and including the step of passing the flow of both vapor and liquid refrigerant from said indoor heat exchanger to said suction accumulator.

28. The method as set forth in claim 27 and including the steps of passing the flow of vapor from the suction accumulator to said compressor and the flow of liquid from said suction accumulator to said pump.

29. The method as set forth in claim 23 and including the steps of, when operating in a heating mode, selectively controlling said reversing valve to pass the flow of refrigerant from the outdoor heat exchanger, through the reversing valve and then to the suction accumulator.

30. The method as set forth in claim 29 wherein said outdoor heat exchanger is sized for a non-complete evaporation, and including the step of passing the flow of both vapor and liquid refrigerant from said outdoor heat exchanger to said suction accumulator.

31. The method as set forth in claim 30 and including the steps of passing the flow of vapor from said suction accumulator to said compressor and the flow of liquid from said suction accumulator to said pump.

32. The method as set forth in claim 28 wherein said liquid contains a lubricant.

33. The method as set forth in claim 29 wherein said liquid contains a lubricant.

34. The method as set forth in claim 22 wherein said refrigerant operates in a subcritical cycle, at least for a portion of the time.

35. The method as set forth in claim 22 wherein said refrigerant operates in a transcritical cycle, at least for a portion of the time.

36. The method as set forth in claim 22 wherein said refrigerant is a refrigerant mixture.

37. The method as set forth in claim 22 wherein an economizer heat exchanger provides a thermal contact between liquid refrigerant outgoing from said pump of said Rankine cycle system and liquid refrigerant entering said expansion device of said vapor compression cycle system.

38. The method as set forth in claim 22 wherein said first heat exchanger is used for heat rejection as an outdoor unit and said second heat exchanger is used as an evaporator providing cooling duty as an indoor unit.

39. The method as set forth in claim 22 wherein, said first heat exchanger is used for evaporation as an outdoor unit and said second heat exchanger is used to provide heating duty as an indoor unit.

40. The method as set forth in claim 22 wherein a reversing valve is installed downstream of a point where refrigerant flow from said expander and refrigerant flow from said compressor are combined, said first heat exchanger is used as an outdoor unit, said second heat exchanger is used as an indoor unit, and said reversing valve is selectively controlled to provide appropriate refrigerant communication with said outdoor unit and said indoor unit to execute cooling and heating duties.

41. The method as set forth in claim 22 wherein, said refrigerant contains a lubricating oil, an oil separator is installed downstream of a point where refrigerant flow from said expander and refrigerant flow from said compressor are combined.

42. The method as set forth in claim 22 wherein oil separated in said oil separator is returned to said compressor.

43. The method as set forth in claim 22 wherein at least a portion of separated oil is returned to said expander.

44. The method as set forth in claim 22 wherein a regenerating heat exchanger provides a thermal contact between refrigerant outgoing from said expander and refrigerant entering said boiler.

* * * * *